Jan. 8, 1957  A. LEYER ET AL  2,776,576
DRIVING DEVICE FOR BELTS
Filed April 1, 1953  6 Sheets-Sheet 2
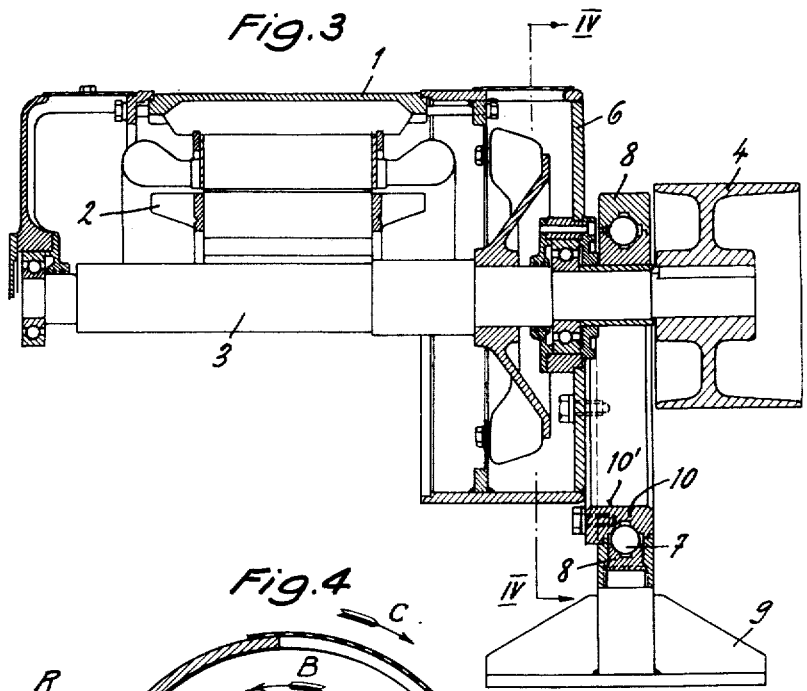
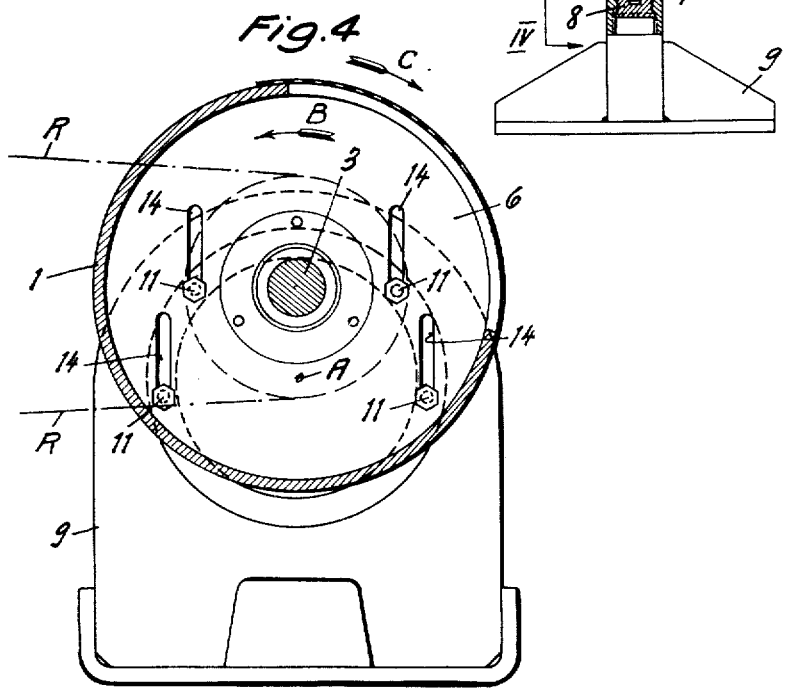
INVENTORS:
ALBERT LEYER
LOTHAR BURGERSTEIN
BY Leon M. Strauss
AGT

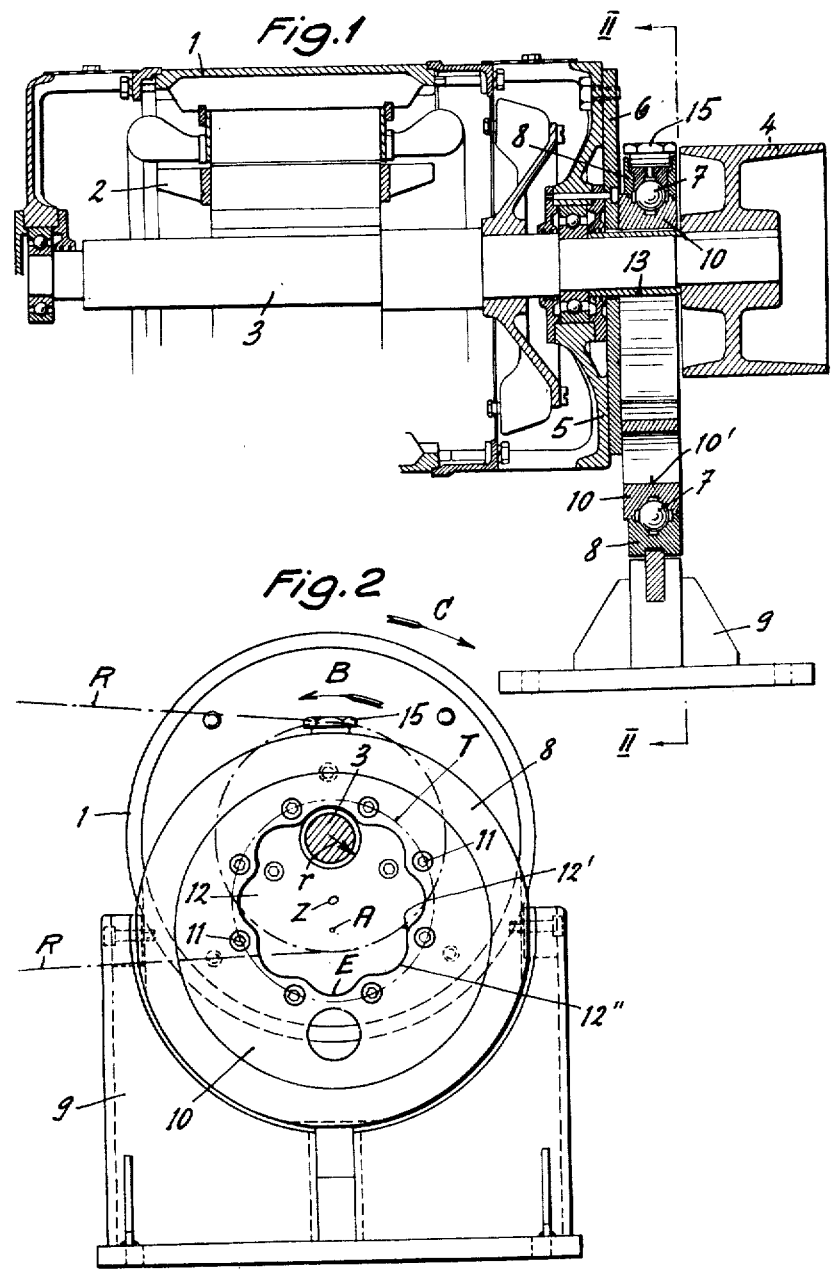

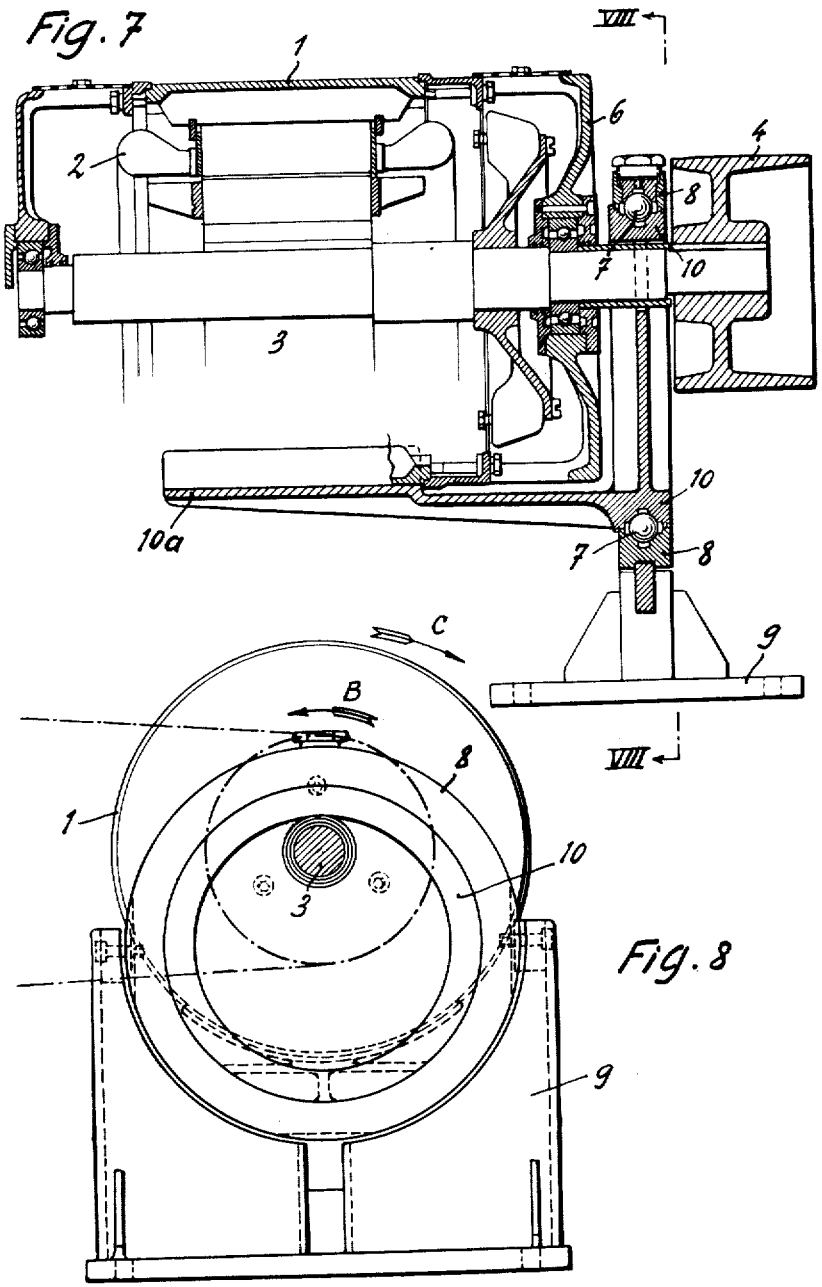

INVENTORS:
ALBERT LEYER
LOTHAR BURGERSTEIN

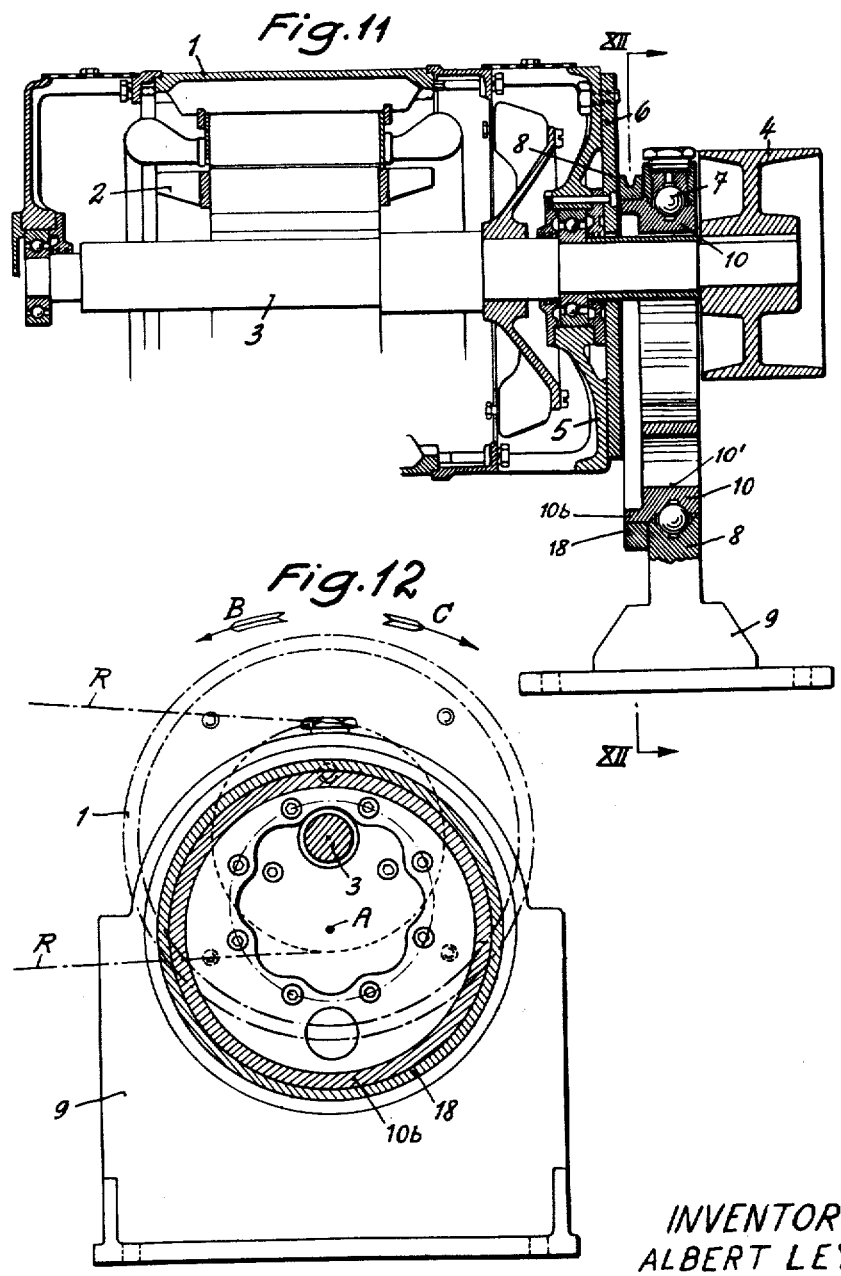

United States Patent Office 2,776,576
Patented Jan. 8, 1957

2,776,576

DRIVING DEVICE FOR BELTS

Albert Leyer, Zurich, and Lothar Burgerstein, Rapperswil, Switzerland

Application April 1, 1953, Serial No. 346,072

8 Claims. (Cl. 74—242.9)

This invention relates to a driving device especially for belt drives, equipped with a stator and a rotor, the stator being slewably journalled around a pivot axle, parallel to its longitudinal axis, in such a way that the stator's torque of reaction tightens the belt.

The driving device according to this invention differs from known driving devices in that journalling of the stator is accomplished by a single roller- or ball bearing, which functions as a combined thrust and radial bearing, arranged between the stator and the driving pulley and which includes an outer fixed circular support and an inner circular race, rigidly connected to the stator, whereby the rotor shaft passes through the bore of the inner circular race in an eccentric position.

This invention makes it possible to give the bedding and suspension of the driving device an extraordinarily sturdy construction, combined with good stability, which with regard to the positive requirement of subsequent adaptation of such driving devices to working machines already in use, such as for instance singly driven looms, is of the highest moment, since in most of such cases there is but a very limited space available for installing or connecting the driving device. It is equally important to provide small dimensions for bedding and suspending such devices in the case of the installation thereof into new working machines.

It is advantageous to construct one of the bearing shields of the motor with the inner circular race of the stator bearing as one piece, such as a casting for instance, or to construct the inner circular race with, for instance, a bracket, both cast in one piece, to bear and to fix the motor.

Several embodiments of the invention will be described by reference to the accompanying drawings, in which:

Fig. 1 is a longitudinal section through the driving mechanism constituting a first embodiment made in accordance with the present invention, and comprising an electric motor with a belt pulley and a stator bearing;

Fig. 2 is a section taken along lines II—II of Fig. 1;

Fig. 3 is a longitudinal section of a second embodiment made in accordance with the present invention;

Fig. 4 is a section taken along lines IV—IV of Fig. 3;

Fig. 7 is a longitudinal section of a fourth embodiment in accordance with the present invention;

Fig. 8 is a section taken along lines VIII—VIII of Fig. 7;

Fig. 11 is a longitudinal section of a driving mechanism similar to that of Fig. 1 and showing the braking means for the bearing races; and Fig. 12 is a sectional view taken along line XII—XII in Fig. 11.

Figure 5:
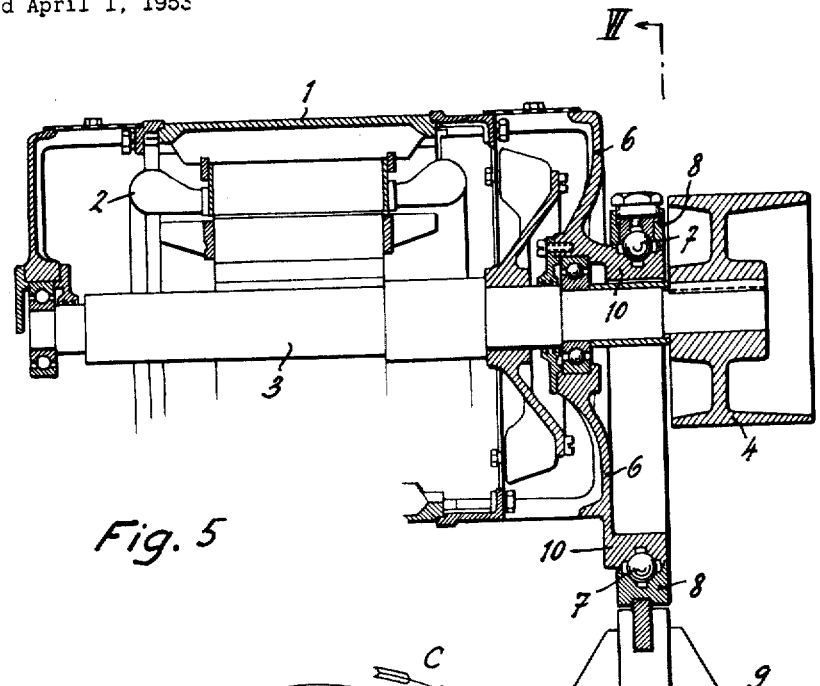
Fig. 5 is a longitudinal section of a third embodiment made in accordance with the present invention.

In the first embodiment according to Figs. 1 and 2, reference numeral 1 indicates the stator and 2 the rotor of an electric motor fitted with a rotor shaft 3, on one end of which a belt pulley 4 is keyed. A cover 5, facing the stator casing 1, is screwed to a flat circular shield 6. Between the shield 6 of the stator and the pulley 4 there is arranged a stator bearing, acting as a thrust and radial bearing, with two circular races 8 and 10, respectively, separated by rollers or balls 7. The outer race 8 is a fixed supporting ring, fitted for this purpose with a foot pedestal 9, by means of which the stator bearing may be fixed to the floor, to the ceiling or to a wall and the like, whereas the inner race 10 may rotate relative to the outer race.

As shown in Figs. 1 and 2, the motor shaft 3 passes through the opening 12 defined by the inner race 10 in an eccentric position relative to said opening. The arrangement is such that the eccentricity between the rotor shaft 3 and the axis A (Fig. 2) of the stator bearing may be varied within a limited range. The shield 6 of the stator casing 1 is detachably fixed to the circular race 10 by means of screws 11. The screws 11 are all arranged on a pitch circle T, the center Z of which is displaced or eccentrically located with regard to the rotor shaft 3 as well as to the bearing axis. The inside contour of the circular race 10, the center of which coincides with the center Z of the pitch circle T, is wavy or scalloped with wave-shaped portions 12' and 12" (Fig. 2) respectively. The radii of said portions 12', 12" are such as to correspond, at least approximately, to the outer radius r (Fig. 2) of the hollow stay or bushing 13, pushed on to the motor shaft 3.

As the pulley 4 revolves in direction of the arrow B, shown in Fig. 2, a counter-torque will be produced in the stator 1 which tends to slew the stator, i. e. the electric motor, in direction of the arrow C around the axis A of the bearing. This counter-torque reacts on the belt R producing an additional tension that increases as the load on the motor increases and decreases as the output of the motor falls. Thus the adhesive properties of the belt drive automatically will get adjusted to perfection. In the position shown in Fig. 2, the eccentricity between the rotor shaft 3 and the axis A of the bearing is greatest and the belt tension produced by the counter-torque lowest with the belt pulley rotating in the shown direction. In other positions of the motor shaft 3, with regard to the axis of the bearing, the eccentricity is less, the tension of belt, due to the reacting torque, however, stronger, dropping to zero as the eccentricity passes the value of zero. Upon loosening screws 11, should the motor be displaced until the rotor shaft assumes a position on the opposite wavy portion E (Fig. 2), the eccentricity will become negative, so that the reacting torque will act in a direction contrary to that indicated by the arrow C. In this case the ends of the belt R must not point to the left (Fig. 2) but to the right side of the motor.

In the second embodiment according to Figs. 3 and 4, again 1 indicates the stator casing, 2 the motor with the rotor shaft 3, 4 the pulley, 6 the shield fixed to the face of the stator casing, 7 balls of the stator bearing, 8 the fixed annular support with its foot (pedestal) 9, and 10 the inner ball race of the stator bearing.

11 indicates screws fixed to the ball race and which pass through the shield 6 through slots 14 parallel with each other. A again represents the axis of the stator bearing and R the belt, whereas the arrows B and C show the direction of rotation of the pulley and the direction of the reacting counter-torque.

With the embodiment of Figs. 3 and 4, increasing and reducing of the eccentricity will be accomplished by linear displacement of the motor in direction of the slots 14. Once the motor is adjusted to the required eccentricity, the screws 11 should be tightened and thus the shield 6, together with the motor, will be locked to the ball race 10 by friction.

As shown in Figs. 1 and 2, cap 15 seals off an opening in supporting ring 8, through which the balls 7 may be dropped between the two races 8 and 10 respectively. It is advantageous to drop between the single balls 7 stays of wood, felt and the like soaked in oil or grease in order to reduce the slipping friction of the balls.

Figure 6:
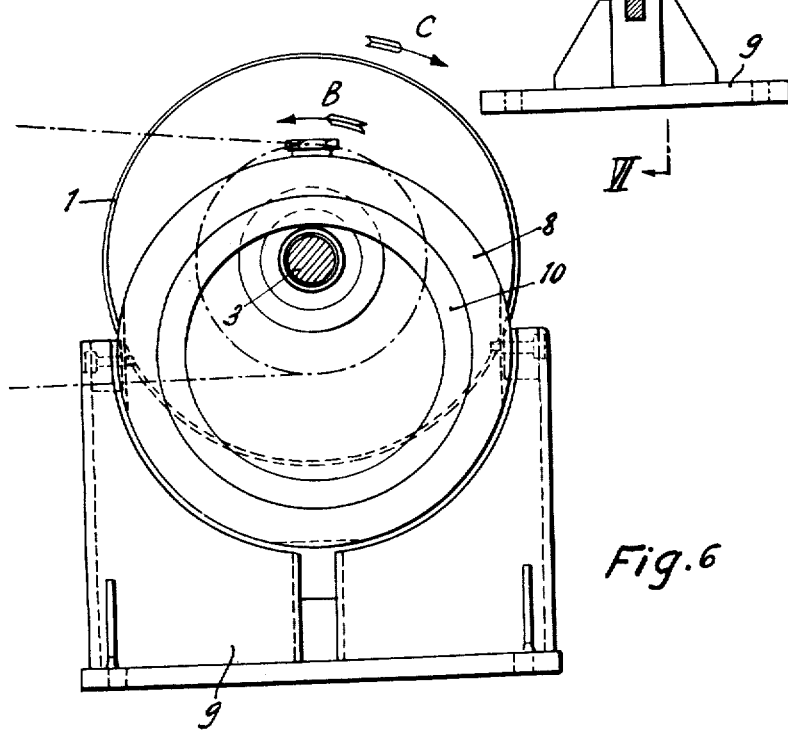
Fig. 6 is a section taken along lines VI—VI of Fig. 5.

With the embodiment shown in Figs. 5 and 6, 1 again designates the stator and 2 the rotor of the electric motor with its rotor shaft 3, on one end of which a pulley 4 is keyed. Between the stator, i. e. the bearing shield 6 of same, and the pulley 4 the stator bearing with the two races 8 and 10 and the balls 7, dropped between these races, is arranged. The outer race 8 is a fixed annular support and for this purpose is also fitted with a pedestal 9, by means of which the stator bearing may be fixed to the floor, to the ceiling or to a wall and the like, whereas the inner race 10 is made in one piece with the bearing shield 6 of the stator, as a casting for instance.

With the embodiment of Figs. 7 and 8, 1 again represents the stator and 2 the rotor of the motor with the shaft 3, to one end of which a pulley 4 is keyed. Between the stator, i. e. the bearing shield 6, and the pulley 4 the stator bearing with the two races 8 and 10, respectively, and the balls 7, dropped from above, is arranged. The outer race 8 is a stationary supporting ring and fitted, for this purpose, with a pedestal 9, by means of which the stator bearing may be fixed to the floor, the ceiling or to a wall and the like, whereas the inner race 10 is fitted with a horizontal protruding support 10a, to which the stator 1 may be fixed detachably.

In this last described modification the race 10 is integral with the bracket 10a, comprising a casting for instance. Alternatively, the bracket may detachably be fixed to the race.

Figure 9:
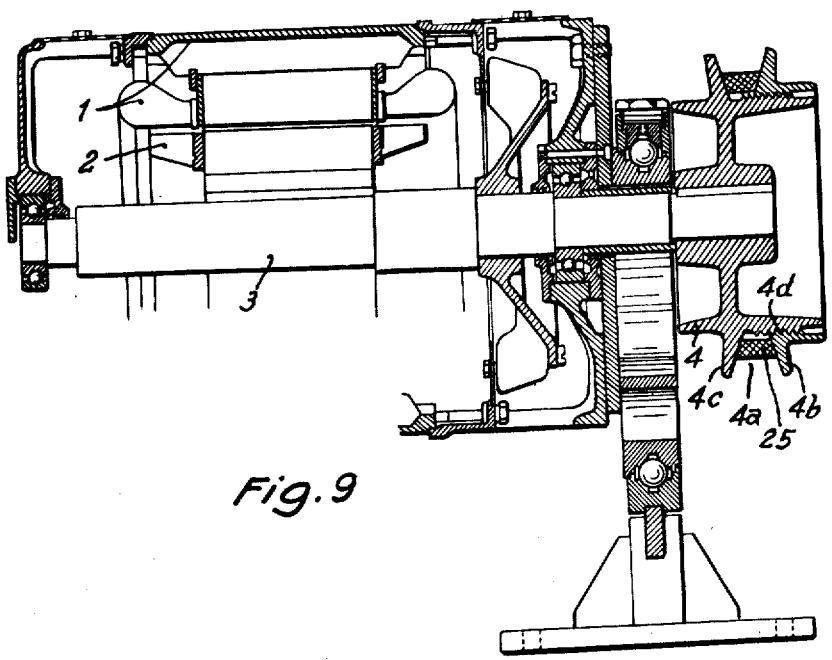
Fig. 9 is a longitudinal section through a portion of the driving mechanism of a fifth embodiment equipped with a pulley for a wedge-shaped belt.

In Fig. 9, the stator is designated 1, while 2 indicates the rotor of the motor with the rotor shaft 3, to one end of which a pulley 4 is keyed. The pulley has a wedged groove 4a on its circumference, whereby one of the groove flanges 4b, that faces its mate 4c (a portion of the pulley 4) may be displaced axially in order to vary the ratio of the belt drive. For this purpose the flange 4b is screwed on to a threaded cylindrical portion 4d of the pulley 4 and may be adjusted relative to the body of the pulley 4 in axial direction by rotation, so that the belt 25 of wedge section will run on a larger or smaller average diameter, according to the adjustment of the flange 4b relative to its mate 4c.

Figure 10:
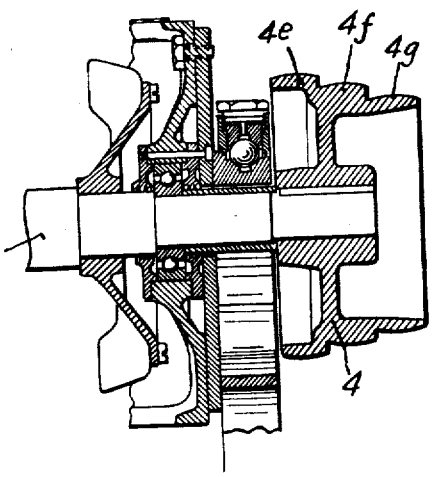
Fig. 10 is a longitudinal section of a sixth embodiment equipped with a cone pulley.

With the embodiment of Fig. 10 the rotor shaft 3 is fitted with a cone pulley with, for instance, three steps 4e, 4f, 4g.

In Fig. 10 the cone pulley is given a shape suitable for a flat belt, but instead wedged grooves of different diameters could just as well be provided along the circumference of the pulley.

Furthermore, according to the invention there is provided a device for generating a counter-torque to compensate or oppose the torque produced by the weight of the motor, this last-mentioned torque normally having the effect of additionally tightening the belt.

Without this device, not only would the reaction torque of the motor tighten the belt but also the torque produced by the weight-component of the motor, so that the belt would never relax, not even when the motor stops.

Advantageously, supporting ring 8 and pedestal 9 may be integral, whereby the outer bearing race will be cut out of the pedestal.

This arrangement is very important since it makes it possible to give the bearing a decidedly more sturdy construction. Still a more outstanding advantage of this design is the fact that with it the use of ball- or roller- bearings, available on the market, can be dispensed with since such roller- or ball-bearings, ready for cavity-mounting, and of sufficiently large required dimensions, are exceptionally expensive and would raise the cost of the motor and pulley system to such an extent that in many cases such systems would become unmarketable. Moreover, these bearings, ready for cavity-mounting, are designed for heavy duty, whereas for the purpose of the invention simple and cheap ball- or roller-bearings will do and could be produced by factories and workshops not outfitted with the special machine tools indispensable for the production of heavy duty ball bearings. Only simple means adapted for mass production are necessary since the requirements as to capacity and life of ball- or roller-bearings for the purpose according to this invention are very low in view of the very small slewing displacements to be dealt with.

It is further very appropriate to add to the driving device a brake that acts at least in one direction of revolution, and in such a way that it deadens slewing of the motor by which motion the belt would relax. This brake, which is illustrated in Figs. 11 and 12, appropriately consists of two collars or discs 18 and 10b, concentric with the bearings 7, 8, 10. The fixed collar 18 is attached to the fixed supporting ring 8, as by screws (not shown), whereas the other collar 10b is connected to the race 10. Both collars or discs are constructed with relatively smooth surfaces with a tough oil film between the contacting surfaces so that the relative displacement of both damping rings or discs is counter-acted by the cohesion properties of the oil film, which results in a braking action.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A driving device especially for belt driven pulleys, equipped with a stator, with a rotor and with a shaft for said rotor, said stator being journalled around a pivotal axle parallel to its own longitudinal axis, in such a way that the reaction torque of the stator results in a tightening of the belt; comprising combined thrust and radial bearing means for said stator and arranged between said stator and said pulley, said bearing means including an outer ring and an inner ring rotatably disposed within said outer ring, said inner ring being rigidly fixed to said stator, said rotor shaft extending through an opening defined by said inner ring and in eccentric position with respect to said opening and a supporting pedestal fixedly connected to said outer ring.

2. A device according to claim 1, said inner ring being provided with a bracket, said stator being detachably fixed to said bracket.

3. A device according to claim 2, said bracket and said inner ring being constructed as an integral piece.

4. A device according to claim 1, said stator being fixed to said inner ring by means of screws positioned along a circle, the center of said circle being eccentric relative to said rotor shaft, whereby upon angular displacement of the stator around the center of said circle the eccentricity between said stator and said inner ring may be varied.

5. A device according to claim 4, said center of said circle being also eccentric relative to the axis of said stator.

6. A device according to claim 1, including a brake acting at least in one direction of rotation, said brake having one fixed part connected to said outer ring, and a movable part fixed to said inner ring, whereby said brake deadens the slewing motion of said stator resulting in a relaxing of the belt.

7. A device according to claim 6, said brake including two collars concentric with said inner and outer rings and facing each other but separated by a tough oil film, said facing collars being free to move relative to one another, whereby the cohesion of said oil film counteracts such relative displacement of said collars and effects as a braking action thereon and onto said rings.

8. A device according to claim 1, further comprising a shield affixed to said stator and arranged concentrically with respect to said shaft, said shield being disposed between said stator and said inner ring and being provided with slots, and screws extending through said slots and threadedly engaging said inner ring, thereby permitting said stator together with said rotor to be shifted relative to the center of said inner and outer rings.

References Cited in the file of this patent

UNITED STATES PATENTS

| | | |
|---|---|---|
| 2,074,135 | Warner | Mar. 16, 1937 |
| 2,108,367 | Christian | Feb. 15, 1938 |
| 2,186,808 | Pilkington | Jan. 9, 1940 |

UNITED STATES PATENT OFFICE

CERTIFICATE OF CORRECTION

Patent No. 2,776,576 January 8, 1957

Albert Leyer et al.

It is hereby certified that error appears in the above numbered patent requiring correction and that the said Letters Patent should read as corrected below.

In the heading to the printed specification, between lines 5 and 6, insert -- Claims priority, application Switzerland April 3, 1952 --.

Signed and sealed this 27th day of August 1957.

(SEAL)
Attest:

KARL H. AXLINE
Attesting Officer

ROBERT C. WATSON
Commissioner of Patents